(12) United States Patent
Fujimaki et al.

(10) Patent No.: US 6,789,399 B1
(45) Date of Patent: Sep. 14, 2004

(54) METHOD FOR MEASURING THE TWISTING OF AN OPTICAL FIBER, AND A METHOD AND APPARATUS FOR MANUFACTURING OPTICAL FIBERS

(75) Inventors: Munehisa Fujimaki, Chiba-ken (JP); Koichi Takahashi, Chiba-ken (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 09/743,115

(22) PCT Filed: May 12, 2000

(86) PCT No.: PCT/JP00/03061

§ 371 (c)(1),
(2), (4) Date: Jan. 5, 2001

(87) PCT Pub. No.: WO00/69782

PCT Pub. Date: Nov. 23, 2000

(30) Foreign Application Priority Data

May 14, 1999 (JP) .............................. 11-135043
Apr. 27, 2000 (JP) ........................... 2000-128307

(51) Int. Cl.[7] .................. C03B 37/027; C03B 37/07
(52) U.S. Cl. .................... 65/382; 65/402; 65/491; 65/504
(58) Field of Search .................. 65/378, 381, 382, 65/402, 435, 491, 504

(56) References Cited

U.S. PATENT DOCUMENTS

| | | |
|---|---|---|
| 4,473,273 A | 9/1984 | Hodge |
| 5,298,047 A | 3/1994 | Hart, Jr. et al. |
| 5,418,881 A | 5/1995 | Hart, Jr. et al. |
| 5,581,647 A | 12/1996 | Onishi et al. |
| 5,704,960 A | 1/1998 | Evans et al. |
| 5,822,487 A | 10/1998 | Evans et al. |

FOREIGN PATENT DOCUMENTS

| | | | | |
|---|---|---|---|---|
| CN | 1083449 A | | 3/1994 | |
| EP | 0 698 582 A2 | | 2/1996 | |
| EP | 0 729 919 A2 | | 4/1996 | |
| GB | 2101762 | * | 1/1983 | .................. 65/435 |
| JP | 61-40836 | | 2/1986 | |
| JP | 63-8233 | | 1/1988 | |
| JP | 6-171970 | | 6/1994 | |
| JP | 8-59278 | | 3/1996 | |
| JP | 8-277139 | | 10/1996 | |
| JP | 8-295528 | | 11/1996 | |
| JP | 11-501113 | | 1/1999 | |
| KR | 98-702330 | | 7/1998 | |
| WO | WO 83/00857 | | 3/1983 | |
| WO | WO 97/07067 | | 2/1997 | |
| WO | WO 97/22897 | | 6/1997 | |
| WO | WO 97/26221 | | 7/1997 | |
| WO | WO 98/46536 | | 10/1998 | |

OTHER PUBLICATIONS

Journal of Lightwave Technology, vol. 6, No. 9, Sep. 1988, pp. 1402–1405, "Technique for Controlling the Internal Rotation of Principal Axes in the Fabrication of Birefingent Fibers".

* cited by examiner

Primary Examiner—John Hoffmann
(74) Attorney, Agent, or Firm—Chadbourne & Parke, LLP

(57) ABSTRACT

When an optical fiber 3 is formed by drawing a preform 1, twisting is generated in the optical fiber 3. An outer diameter of the optical fiber 3 is continuously measured along a longitudinal direction of the optical fiber 3 from two different directions in a plane perpendicular to the advancing direction of the optical fiber 3 by a device for measuring twisting 4, thus twisting of the optical fiber 3 is measured.

10 Claims, 6 Drawing Sheets

METHOD FOR MEASURING THE TWISTING OF AN OPTICAL FIBER, AND A METHOD AND APPARATUS FOR MANUFACTURING OPTICAL FIBERS

TECHNICAL FIELD

The present invention relates to a method and an apparatus for measuring the twisting state of an optical fiber in a method for generating twisting in the optical fiber during the manufacturing of the optical fiber in order to obtain an optical fiber having small polarization mode dispersion.

This application is based on Japanese Patent Applications (Patent Applications. Nos. Hei 11 (1999)-135043 and 2000-128307), and the contents of these Japanese Patent Applications are incorporated as parts of this specification.

BACKGROUND ART

Heretofore, with regard to the manufacturing of an optical fiber by drawing a cylindrical preform made of silica based glass, a method for obtaining an optical fiber having small polarization mode dispersion (PMD) by generating twisting in the optical fiber has been proposed.

For example, a method for carrying out drawing while rotating a preform at a high speed is proposed in Japanese Patent Laid-Open No. Hei 8 (1996)-59278.

In Japanese Patent Laid-open No. Hei 8 (1996)-295528, disclosed is a method for generating twisting in a primary coated optical fiber by guiding an optical fiber having a primary coating layer formed thereon with a swing guide roller reciprocated to change the inclination of a rotary shaft, and then guiding the same with the guide roller having the rotary shaft fixed thereto.

In Japanese Patent Laid-Open No. Hei 9 (1997)-2834, disclosed is a method for generating twisting in a primary coated optical fiber by guiding an optical fiber having a primary coating layer formed thereon by using a roller adapted such that an angle between a rotary shaft direction and a circumferential surface can be changed in a circumferential direction.

In Japanese Patent Indication No. Hei 10 (1998)-507438, proposed is a method for adding twisting to an optical fiber by moving two pulleys forward and backward in opposing directions along a direction perpendicular to the longitudinal direction of the optical fiber in a state where the optical fiber having a coating layer formed thereon is held between the two pulleys rotated in opposing directions.

Incidentally, the PMD characteristic of an optical fiber manufactured while adding twisting as described above is decided by the twisting state of an optical fiber, for example, in which direction twisting is generated and how many times the twisting is generated in the optical fiber of a fixed length. However, no proposals have been made regarding a method for measuring the state of twisting added to an optical fiber. Therefore, the twisting state of an optical fiber has heretofore had to be predicted from the apparent number of rotations calculated based on manufacturing conditions including the number of rotations of a preform, the moving speed of a pulley, and the like. However, there has not always been coincidence between the apparent number of rotations and the actual number of rotations (substantial number of rotations), and thus the conventional method has lacked accuracy.

The present invention was made considering the foregoing problems, and it is an object of the invention to enable the actual twisting state of an optical fiber manufactured while adding twisting to be measured accurately.

DISCLOSURE OF THE INVENTION

A method for measuring twisting of an optical fiber of the present invention has a feature in that an outer diameter of the optical fiber is continuously measured along the longitudinal direction of the optical fiber from two different directions in a plane perpendicular to the longitudinal direction of the optical fiber.

An apparatus for measuring twisting of an optical fiber of the present invention comprises: means for continuously measuring an outer diameter of the optical fiber along the longitudinal direction of the optical fiber from two different directions in a plane perpendicular to the longitudinal direction of the optical fiber.

A method for manufacturing an optical fiber of the present invention comprises the steps of: forming the optical fiber by drawing a preform; generating twisting in the optical fiber; and continuously measuring an outer diameter of the optical fiber from two different directions in a plane perpendicular to the advancing direction of the optical fiber.

An apparatus for manufacturing an optical fiber of the present invention comprises: means for forming the optical fiber by drawing a preform; means for generating twisting in the optical fiber; and means for continuously measuring an outer diameter of the optical fiber from two different directions in a plane perpendicular to the advancing direction of the optical fiber.

BRIEF DESCRIPTION OF THE DRAWINGS

FIG. 2 is a view showing a drawing process according to the present invention.

BEST MODES FOR CARRYING OUT THE INVENTION

Hereinbelow, the present invention will be described in detail.

Figure 1:
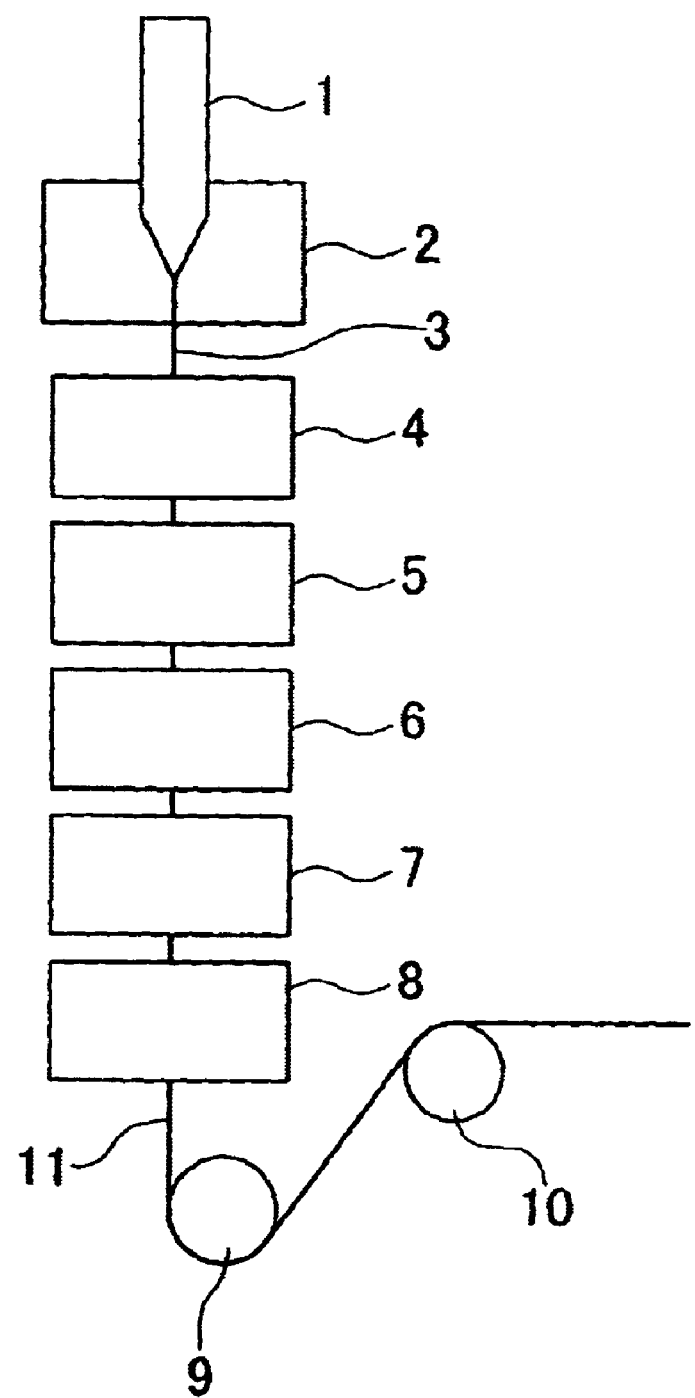
FIG. 1 is a schematic constitutional view showing an apparatus for manufacturing an optical fiber of a first embodiment of the present invention.

FIG. 1 is a schematic constitutional view showing an example of the first embodiment of an apparatus, which is preferred for carrying out a method for manufacturing an optical fiber of the present invention. In the drawing, a reference numeral 1 denotes a preform. FIG. 2 shows a drawing process of the preform 1.

The apparatus of the described embodiment comprises: a heating furnace 2; a 1 device for measuring twisting 4; a coating device 5; a coating concentricity monitor 6; an ultraviolet lamp device 7; an outer diameter measuring device 8; a turn pulley 9; and a guide pulley 10. In addition, as a means for generating twisting in the optical fiber, a means for rotating the preform 1 at a high speed (not shown) is provided.

To manufacture an optical fiber by using the apparatus of the described embodiment, first, the preform 1 is vertically inserted into the heating furnace 2 while being rotated at a high speed, and then heated, melted, and drawn, thus an optical fiber 3 having twisting generated therein is formed. The rotational direction of the preform 1 is maintained to be constant.

The optical fiber 3 formed by the drawing is introduced to the device for measuring twisting 4. The device for measuring twisting 4 can employ any optional constitution as long as it comprises means for measuring an outer diameter of the optical fiber 3 before a coating layer is formed simultaneously from two different directions in a plane perpendicular to the advancing direction of the optical fiber 3. By use of the result of this measurement, the state of twisting generated in the optical fiber 3 is measured by a measuring method to be described later.

The optical fiber 3 passed through the device for measuring twisting is immediately subjected to coating to prevent its damaging or the like, and then becomes a primary coated optical fiber 11. In other words, the optical fiber 3 is introduced to the coating device 5, and while it is passed through this device, an ultraviolet curing resin is coated around the optical fiber 3. Subsequently, after the evenness of resin thickness is monitored during the passage through the coating concentricity monitor 6, ultraviolet ray irradiation is carried out during the passage through the ultraviolet lamp device 7 to cure the remain, and a primary coating layer is formed.

The primary coated optical fiber 11 having the primr coating layer formed on the optical fiber 3 is measured for its outer diameter while it is passed through the outer diameter measuring device 8, then guided by the turn pulley 9, the guide pulley 10, and the like, and then wound on a bobbin (not shown).

Next, the method for measuring twisting of the present invention will be described.

The method for measuring twisting of the present invention makes use of the fact that the optical fiber 3 formed by the drawing is shaped not completely circular but slightly noncircular in section. In other words, although the ideal shape of the section of the optical fiber 3 is completely circular, as a matter of fact it is noncircular having a noncircular rate of approximately 0.1 to 0.5%. A noncircular rate is defined as follows:

(Long diameter–short diameter)/long diameter×100(%)

A difference between the long and short diameters in the section of the optical fiber 3 is approximately 0.1 to 0.6 μm. Reasons for the noncircular shape of the optical fiber 3 includes: technical impossibility of forming the preform 1 in a completely circular shape and the preform 1 itself has a slight noncircular shape; incomplete axial symmetry of a temperature distribution in the heating furnace 2 used during drawing; and the like.

Figure 2A:
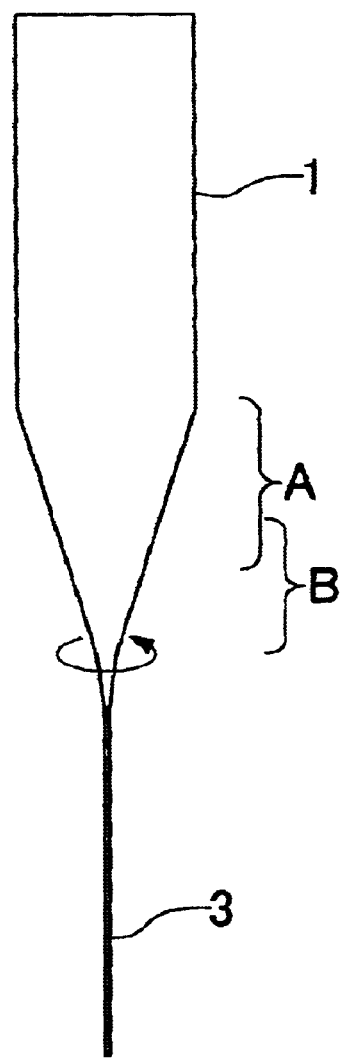
FIG. 2(A) illustrating meniscus portion.
Figure 2B:
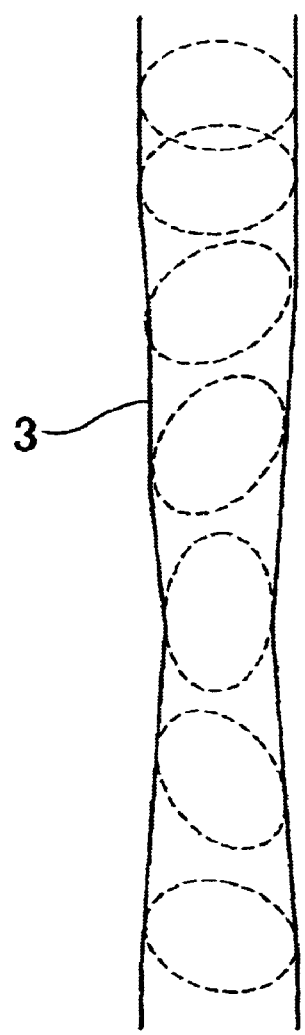
FIG. 2(B) illustrating a noncircular state of the optical fiber in exaggeration.

In the drawing process shown in FIG. 2(A), if drawing was carried out with the addition of twisting like that in the described embodiment, the present inventors discovered the following. Specifically, twisting is generated in the optical fiber 3 in a meniscus lower portion B where the temperature of the preform 1 becomes highest, and the noncircular state of the optical fiber 3 is substantially decided in a meniscus upper portion A located above the portion B.

In other words, in the optical fiber 3, twisting is generated after a noncircular state is decided in the drawing process. Thus, as shown in the exaggerated noncircular state of the section of the optical fiber 3 of FIG. 2(B), along the longitudinal direction of the optical fiber 3, the long diameter direction of the section of the optical fiber 3 is changed to be gradually rotated around an axis.

Figure 3:
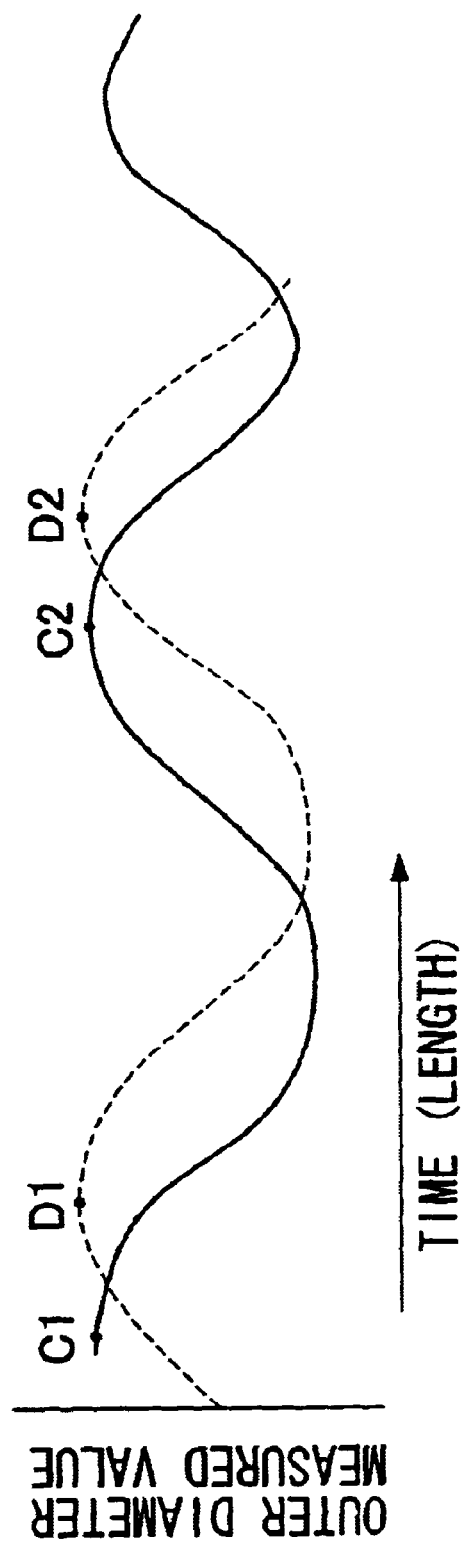
FIG. 3 is a graph showing an example of a result of measurement obtained by an apparatus for measuring twisting of the present invention.

Therefore, by fixing the measuring position and continuously monitoring the outer diameter of the advancing optical fiber 3 along the longitudinal direction, a measured value of the outer diameter becomes, for example, a waveform graph as shown in FIG. 3. In FIG. 3, an ordinate indicates a measured outer diameter value. An abscissa indicates time, that is, the length of the optical fiber 3. The amplitude of the waveform graph obtained in this way is a difference between long and short diameters in the section of the optical fiber 3, and a cycle represents a length while twisting makes a half rotation.

In the embodiment, two outer diameter measuring devices (C and D) are used in the device for measuring twisting 4, and the outer diameter of the optical fiber 3 is measured from two different directions in a plane perpendicular to the advancing direction (longitudinal direction) of the optical fiber 3. The measurements from the two directions are carried out simultaneously. In addition, the measurement of the outer diameter is carried out continuously along the longitudinal direction. For example, in the case where an angle θ made between the measuring directions of the two outer diameter measuring devices is 45°, the measured values of outer diameters in the respective devices change like those indicated by solid and broken lines in FIG. 3. In FIG. 3, the solid line indicates a measuring result of the device C, and the broken line indicates a measuring result of the device D.

Assuming that no twisting is generated in the optical fiber 3, the measured value of the outer diameter in the device C and the measured value in the outer diameter D take different values. However, no changes occur in the lapse of time, and the graph has two straight lines parallel to the abscissa.

Furthermore, assuming that the optical fiber 3 is not noncircular but completely circular, then even in the case where twisting is generated or is not generated in the optical fiber 3, the measured values of outer diameters by the devices C and D take equal values, and no changes occur in the lapse of time. Accordingly, the graph has one straight line parallel to the abscissa.

In the embodiment, since the graph of a shape having two waveforms shifted in the abscissa direction like that shown in FIG. 3 is obtained, by various methods, a difference in phase between the two waveforms is obtained, and the rotational direction and the substantial number of rotations of twisting of the optical fiber 3 are thereby calculated.

For example, there is a method of comparison, where the measured value of the outer diameter is differentiated, and the time of a point (peak) indicating a maximum value is calculated. Specifically, assuming that the peak of time according to measuring results in the device C are C1 and C2 in the order of earlier time, and the peak of time according to measuring results in the device D are D1 and D2 in the order of earlier time, then C2-C1 or D2-D1. represents the time of half rotation of twisting. When this is multiplied by the advancing speed (drawing speed) of the optical fiber 3, a length while the twisting making half rotation is obtained. Alternatively, representation can be made by the number of rotations of twisting in the optical fiber 3 having a fixed length.

Also, a rotational direction can be identified by using three points including two peaks (for example, C1 and C2) in one device and a peak (for example, D1) in the other device present between the two peaks. Specifically, if an angle θ made between the measuring directions of the two measuring devices is a sharp angle, then a smaller one between the three point intervals indicates a rotational direction. For example, in FIG. 3, D1-C1 is smaller than C2-D1. Since each peak indicates the time when a long diameter is located in the measuring direction of each measuring device, it can be understood that in FIG. 3, in the time from C1 to D2, the direction of the long diameter of the optical fiber 3 is changed from C1 to D1 accompanied with the advancement of the optical fiber 3, and it can be also understood that the rotational direction of twisting is directed from the measuring direction of the device to the measuring direction of the device D.

Figure 4:
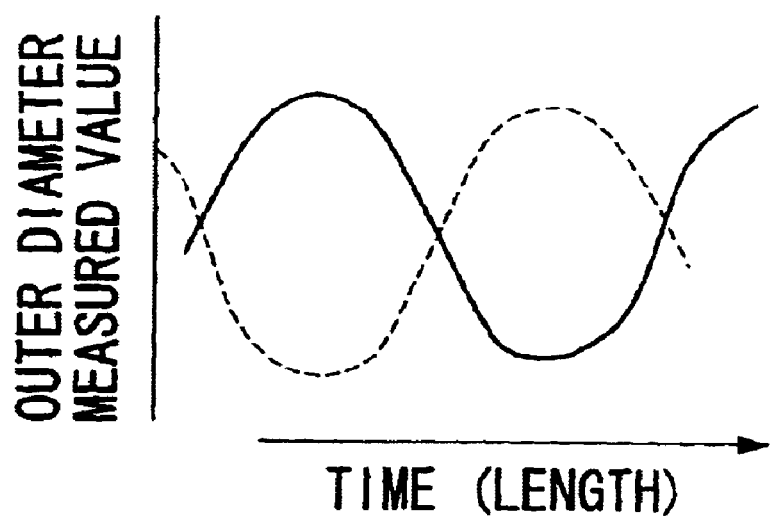
FIG. 4 is a graph showing another example of a result of measurement obtained by the apparatus for measuring twisting of the present invention.

On the other hand, if an angle θ made between the measuring directions of the two measuring devices is a dull angle, then a larger one between the above three point intervals indicates a rotational direction of twisting. If an angle made between the measuring directions of the two measuring devices is 90°, the result of measurement is like that shown in FIG. 4. Since the results of measurement are identical even if rotational directions are different, a rotational direction cannot be determined although a substantial number of rotations can be calculated. In addition, if an angle θ made between the measuring directions of the two measuring devices is 180°, since the results of measurements of both devices are identical, no measurement of twisting can be made.

Therefore, an angle θ made between the measuring directions of the two measuring devices is set in the range of 0<θ<90 or 90<θ<180, preferably in the range of 25<θ<65 or 115<θ<155. Such setting is convenient for obtaining a rotational direction, as peak intervals are obtained by a preferable distance.

According to the described embodiment, since the substantial number of rotations and the rotational direction of twisting in the optical fiber 3 are accurately measured, the actual twisting state can be accurately recognized. By using this, it is possible to represent a relation between the twisting state of the optical fiber 3 and polarization mode dispersion in a numerical value, facilitating the setting or the like of manufacturing conditions for manufacturing an optical fiber having small polarization mode dispersion. For example, conditions for causing twisting in the optical fiber 3 are changed beforehand to manufacture various primary coated optical fibers 11, and the PMD of each primary coated optical fiber 11 is measured to obtain a relation between a twisting state and the PMD. Then, during the manufacturing of the primary coated optical fiber 11, by controlling the means for generating twisting according to the measuring result of the twisting in the optical fiber 3, the PMD of the primary coated optical fiber 11 can be controlled.

The device for measuring twisting of the embodiment can measure twisting by adding two outer diameter measuring devices to an existing optical fiber manufacturing line. Thus, a constitution of the device is simple, and the device can be easily embodied without increasing its size.

Note that, in the embodiment, since the rotational direction of the preform 1 is always maintained to be constant, the twisting rotational direction of the optical fiber 3 is always maintained to be constant. However, the rotational direction of the preform 1 may be changed alternately clockwise and counterclockwise. In this way, the twisting rotational direction of the optical fiber 3 is changed in a longitudinal direction.

As the method for generating twisting in the optical fiber 3, the method of rotating the preform 1 during drawing was used. However, the present invention places no limitation in this regard, and any optional method can be applied as long as it generates twisting after the noncircular state of the optical fiber 3 is substantially decided in the drawing process.

Figure 5A:
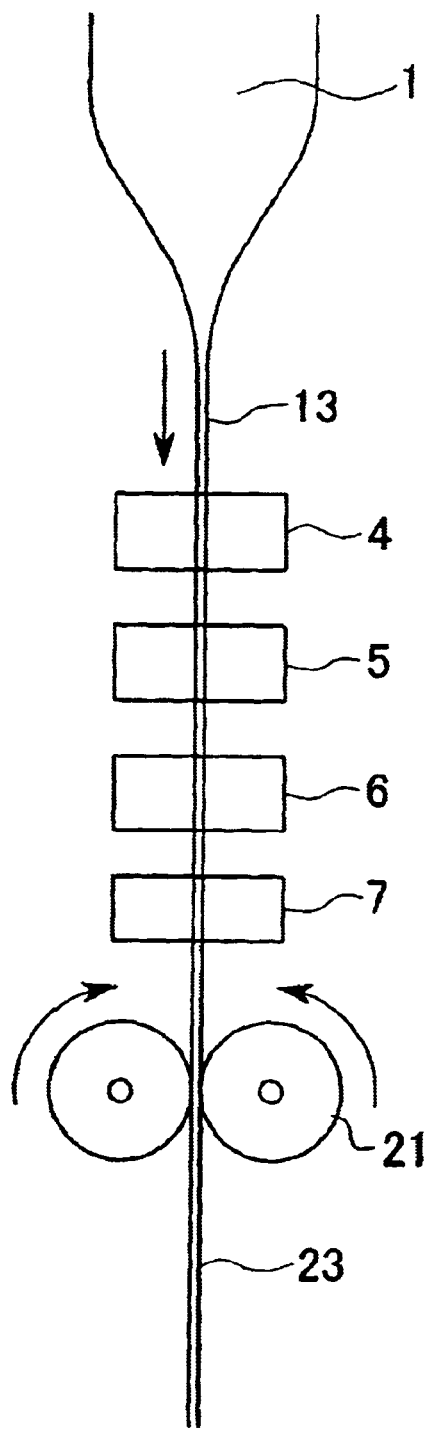
FIG. 5 is a schematic constitutional view showing an apparatus for manufacturing an optical fiber of a second embodiment of the present invention.
Figure 5B:
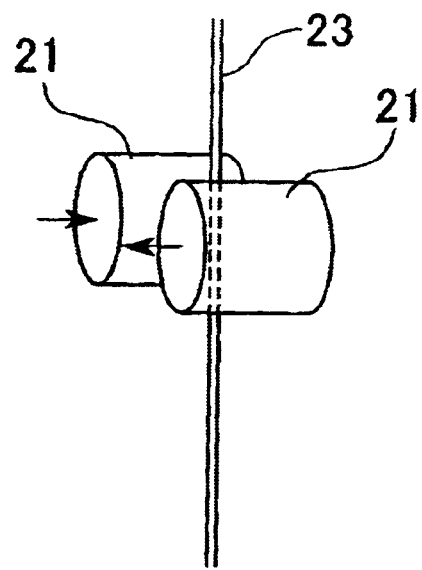

FIG. 5 is a view showing a second embodiment of a preferred apparatus for executing the method for manufacturing an optical fiber of the present invention: FIG. 5(A) being a schematic constitutional view; and FIG. 5(B) being an explanatory view showing an enlarged principal portion of FIG. 5(A). In FIG. 5, the same components as those in FIG. 1 are denoted by the same reference numerals, and description thereof may be sometimes omitted.

The apparatus of the described embodiment is preferably used for manufacturing an optical fiber according to the method disclosed in, for example, Japanese Patent Indication No. Hei 10 (1998)-507438.

In FIG. 5, a reference numeral 21 denotes a pulley for imparting twisting. Two pulleys 21 making a pair are provided so as to sandwich a primary coated optical fiber 23. Each pulley 21 is provided such that its center axis may be perpendicular to the advancing direction of the primary coated optical fiber 23, and is rotated as if being dragged by the traveling primary coated optical fiber 23. As shown by arrows in FIG. 5(B), the pulleys are constituted such that twisting is added to an optical fiber 13 by moving the two pulleys 21 forward and backward in opposing directions to each other along the center axial directions thereof.

In addition, although not shown, a heating furnace is provided to draw the preform 1.

To manufacture an optical fiber by using the apparatus of the embodiment, first, the preform 1 is inserted vertically into the heating finance, then heated, melted, and drawn, thus an optical fiber 13 is formed. The preform 1 is not rotated.

While the optical fiber 13 formed by the drawing being passed through the device for measuring twisting 4, the coating device 5, the coating concentricity monitor 6 and the ultraviolet lamp device 7 in sequence, a coating layer is formed to become a primary coated optical fiber 23. By passing the primary coated optical fiber 23 having the coating layer formed thereon between the pair of pulleys 21, twisting is added to the optical fiber 13. The twisting of the optical fiber 13 is generated in the meniscus lower portion B, where the temperature of the preform 1 in the heating furnace is highest. In the meniscus upper portion A where the noncircular state of the optical fiber 13 is decided, no twisting is generated. The substantial number of rotations of twisting in the optical fiber 13 is decided based on the speed of the forward/backward motion of the pulleys 21, and the direction of twisting is decided based on the cycle of the forward/backward motion of the pulleys 21.

Therefore, by providing the device for measuring twisting 4 between the heating furnace and the coating device 5 to simultaneously measure the outer diameter of the optical fiber 13 from two different directions in a plane perpendicular to the advancing direction of the optical fiber 13, the twisting state generated in the optical fiber 13 can be measured by the foregoing method for measuring twisting.

Also according to the described embodiment, it is possible to accurately measure the substantial number of rotations and the rotational direction of twisting in the optical fiber 13, and an advantage similar to that of the above-described embodiment can be obtained.

Note that according to the present invention, the apparatus for manufacturing an optical fiber is not limited to the above embodiment, it is satisfactory that the device for measure twisting is installed after the drawing process and before the resin coating process, and changes can properly be made.

The method for measuring twisting of the present invention is not limited for application to the optical fiber, and can be applied even when the twisting of a long article noncircular in section is measured. It is not always necessary to carry out measuring noisily from the two directions in the same plane, and it is satisfactory that the results of measurement in the same plane can be compared. For example, measuring can be performed twice along the longitudinal direction of an article to be measured having a specified length by changing an angle by one outer diameter measuring device. In this case, the results of twice measurement which are made from one direction changing the measuring portion along a longitudinal direction are stored in a computer, and then measuring is carried out for the same portion from the other direction. Twisting can be measured by carrying out arithmetic processing while making the results of measurement in the same plane correspond to each other. However, when the article to be measured is in a traveling state like that in the manufacturing process of an optical fiber, or when covering is made immediately after drawing like that in an optical fiber, measurement and arithmetic processing must be quickly carried out. Thus, measuring should preferably be carried out simultaneously from two directions by using the two outer diameter measuring devices.

In addition, although measuring can be carried out not from two directions but from three directions, arithmetic processing may become complex. To identify the direction and the cycle (substantial number of rotations) of twisting, measuring from two directions is enough.

EMBODIMENTS

Hereinbelow, specific embodiments will be described to make apparent the advantages of the present invention.

Embodiment 1

By using the apparatus shown in FIG. 1, a primary coated optical fiber 11 was manufactured while adding twisting to the optical fiber 3. As the device for measuring twisting 4, one provided with two outer diameter measuring devices was used, and an angle θ made between the measuring directions of the respective devices was set equal to 60°.

Conditions for generating twisting in the optical fiber 3 are changed into five ways (conditions a to e), and the manufacturing of primary coated optical fibers 11 was carried out. Also, for reference, a primary coated optical fiber 11 was manufactured without generating twisting thereto.

During manufacturing, by use of the result of measuring an outer diameter from two directions by the device for measuring twisting 4, the substantial number of rotations of twisting generated in the optical fiber 3 was calculated by the method described above in the abovedescribed embodiment. The substantial number of rotations is represented by the number of rotations per 1 m of the optical fiber (unit: rot/m). Also, the value of the polarization mode dispersion (PMD) of the obtained primary coated optical fiber 11 was calculated. These results are shown in the following Table 1.

Moreover, in the described embodiment, since twisting is added to the optical fiber 3 by rotating the preform 1 in one direction, the number of rotations of the preform 1 and the substantial number of rotations of twisting of the optical fiber 3 are equal. Thus, for the purpose of comparison, the number of rotations of the preform 1 is also shown as the apparent number of rotations in Table 1.

TABLE 1

| Condition | Apparent number of rotations (rot/m) | Measured substantial number of rotations (rot/m) | PMD (psec/√km) |
|---|---|---|---|
| Ref (no twisting) | — | 0 | 0.62 |
| a | 0.02 | 0.02 | 0.60 |
| b | 0.5 | 0.5 | 0.16 |
| c | 2.3 | 2.3 | 0.05 |
| d | 12 | 12 | 0.03 |
| e | 26 | 26 | 0.03 |

From the result of Table 1, since the apparent number of rotations and the substantial number of rotations obtained by measuring become equal, it is recognized that the substantial number of rotations of twisting is accurately measured.

Moreover, it is recognized that in the range of 0 to 12 rot/m of the substantial number of rotations, the PMD is reduced as the substantial number of rotations is increased, and in the range of 12 rot/m or higher of the substantial number of rotations, no changes occur in the PMD. From this, it is understood that in this embodiment, during the manufacturing of the primary coated optical fiber 11, the manufacturing condition is controlled such that the substantial number of rotations of twisting measured by the device for measuring twisting 4 can reach 12 rot/m or higher, thus the PMD of the primary coated optical fiber 11 can be minimized. Moreover, in the case where a linear velocity is desired to be increased, the manufacturing condition is controlled within the range capable of securing the substantial number of rotations 12 rot/m or higher, thus an optical fiber having a low PMD can be efficiently manufactured.

Embodiment 2

By using the apparatus shown in FIG. 5, a primary coated optical fiber 23 was manufactured while adding twisting to the optical fiber 13. The device for measuring twisting 4 was constituted similarly to that of the embodiment 1. Note that, as the preform 1, one having a parameter different from that of the embodiment 1 was used.

A distance from the heating furnace outlet to the position where the pulley 21 is provided is changed into two ways, 3 m (position A of the pulley) and 6 m (position B of the pulley), conditions for the forward/backward motion of the pulley 21 are changed into three ways (conditions f to h and i to k) in each of the positions, and the manufacturing of the primary coated optical fiber 23 was carried out. Also, for reference, a primary coated optical fiber 23 was manufactured without generating twisting thereto. When the positions of the pulleys 21 are different, even if the conditions for the forward/backward motion thereof are the same, it is easily predicted that a difference in actual twisting states will occur The cycle of the forward/backward motion of the pulley 21 was maintained to be constant at 0.2 sec.

During manufacturing, by use of the results of measuring the outer diameter from two directions by the device for measuring twisting 4, the substantial number of rotations of twisting generated in the optical fiber 13 was calculated by the method described above in the above-described embodiment. The substantial number of rotations is represented by the number of rotations per 1 m of the optical fiber (unit: rot/m). Also, the value of the polarization mode dispersion (PMD) of the obtained primary coated optical fiber 23 was calculated. These results are shown in the following Table 2.

Moreover, a number of rotations obtained by converting the speed of the forward/backward motion of the pulley 21 is also shown as the apparent number of rotations in Table 2.

TABLE 2

| Position of pulley | Condition | Apparent number of rotations (rot/m) | Measured substantial number of rotations (rot/m) | PMD (psec/√km) |
|---|---|---|---|---|
| A (3m) | Ref (no twisting) | — | — | 0.67 |
| | f | 3.0 | 1.5 | 0.42 |
| | g | 6.0 | 2.9 | 0.22 |
| | h | 12.0 | 5.1 | 0.03 |
| B (6m) | Ref (no twisting) | — | — | 0.65 |
| | i | 3.0 | 0.3 | 0.61 |
| | j | 6.0 | 1.6 | 0.44 |
| | k | 12.0 | 3.7 | 0.17 |

Figure 6:
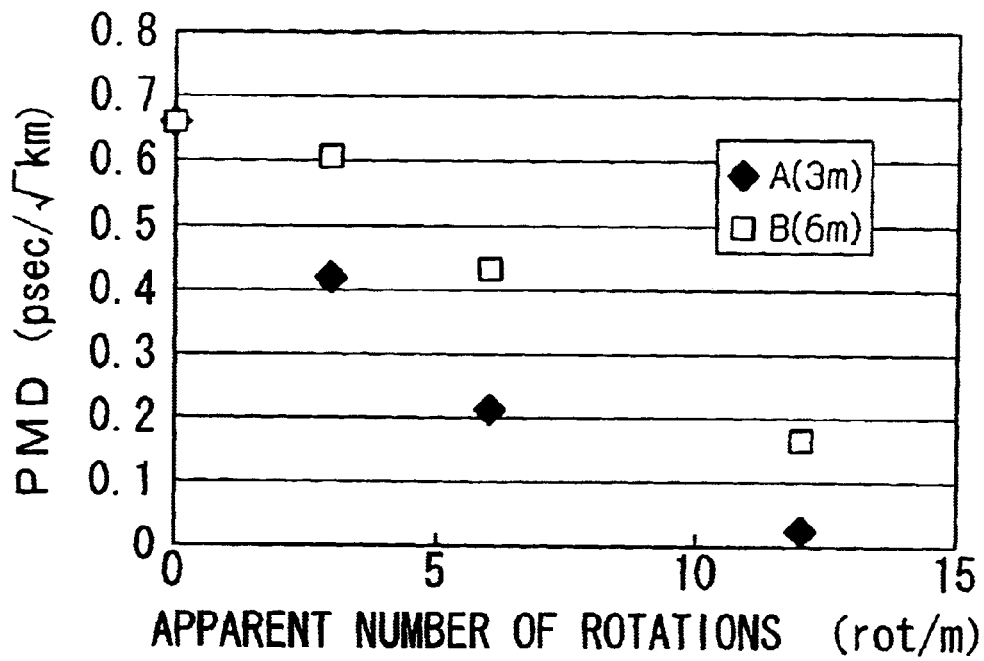
FIG. 6 is a graph showing an example of a result of measurement in the embodiment according to the present invention.

FIG. 6 is a graph showing a relation between the apparent number of rotations obtained by calculation and the PMD of the primary coated optical fiber 23.

Figure 7:
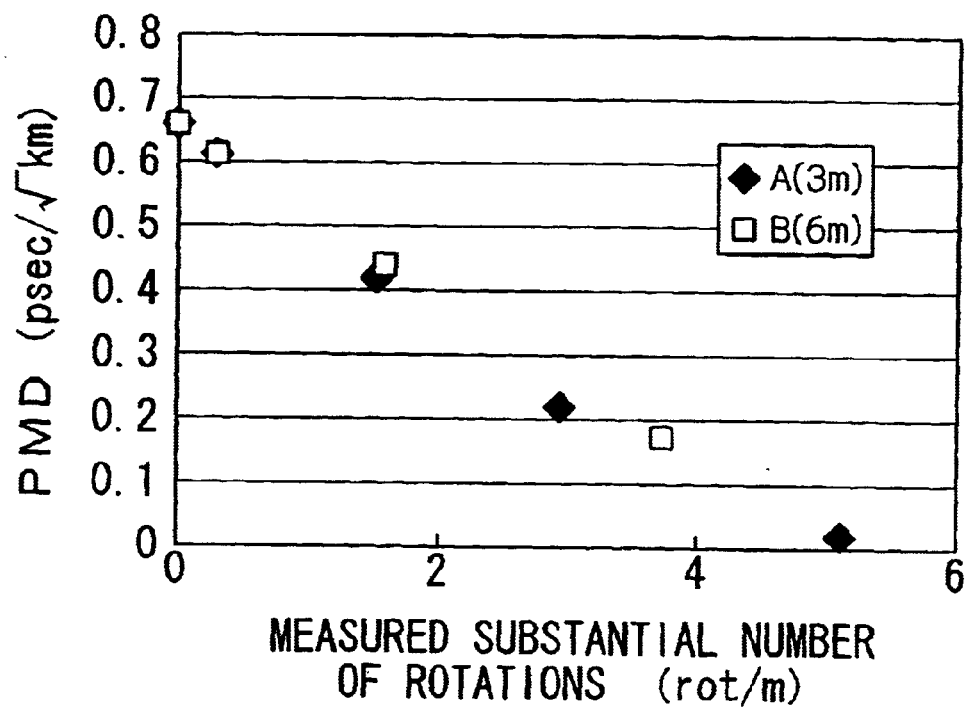
FIG. 7 is a graph showing an example of a result of measurement in the embodiment of the present invention.

FIG. 7 is a graph showing a relation between the substantial number of rotations obtained by measuring and the PMD of the primary coated optical fiber 23.

These results indicate that there is a difference between the substantial number of rotations and the apparent number of rotations. When the position of the pulley 21 was changed, the relation between the apparent number of rotations and the PMD was changed. On the contrary, a good correlation was exhibited between the substantial number of rotations and the PMD irrespective of the position of the pulley 21.

Possibility of Industrial Application

As described above, according to the method for measuring twisting of the present invention, by continuously measuring the outer diameter of the optical fiber along the longitudinal direction from the two different directions in a plane perpendicular to the longitudinal direction of the optical fiber, it is possible to accurately measure the state of twisting generated in the optical fiber. Accordingly, by using this measurement result, a relation between the twisting state of the optical fiber and the polarization mode dispersion can be represented by a numerical value, and the setting or the like of manufacturing conditions during manufacturing an optical fiber having small polarization mode dispersion can be efficiently carried out.

Moreover, since the apparatus for measuring twisting of the present invention can be constructed by using the two outer diameter measuring devices, the constitution of the apparatus is simple and facility of embodying the same is high.

According to the method for manufacturing an optical fiber of the present invention, twisting is generated during the formation of an optical fiber by drawing, thus an optical fiber having small polarization mode dispersion can be obtained, and the outer diameter of the optical fiber is continuously measured from the two different directions in a plane perpendicular to the advancing direction of the optical fiber, thus the twisting state of the optical fiber can be measured. Accordingly, since the manufacturing condition of the optical fiber can be controlled while measuring the state of twisting in the manufacturing process of the optical fiber, a high quality optical fiber can be efficiently manufactured, and yield can be improved.

Furthermore, according to the apparatus for manufacturing an optical fiber of the present invention, since means for measuring the twisting of the optical fiber in line is provided, it is possible to efficiently manufacture an optical fiber having small polarization mode dispersion while controlling means for generating twisting according to the result of measuring twisting.

What is claimed is:

1. A method for measuring twisting of an optical fiber, wherein an outer diameter of the optical fiber is continuously measured along a longitudinal direction of the optical fiber from two different directions in a plane perpendicular to the longitudinal direction of the optical fiber.

2. An apparatus for measuring twisting of an optical fiber, comprising means for continuously measuring an outer diameter of an optical fiber along a longitudinal direction of the optical fiber from two different directions in a plane perpendicular to the longitudinal direction of the optical fiber.

3. An apparatus for measuring twisting of an optical fiber according to claim 2, wherein the two different directions in a plane perpendicular to the longitudinal direction of the optical fiber form an angle θ corresponding to an origin which is a core of the optical fiber, and the angle θ is set in the range of 0°<θ<90° or 90°<θ<180°.

4. An apparatus for measuring twisting of an optical fiber according to claim 2, wherein the angle θ is set in the range of 25°<θ<65° or 115°<θ<155°.

5. A method for manufacturing an optical fiber, comprising the steps of: forming an optical fiber by drawing a preform; generating twisting in the optical fiber; and continuously measure an outer diameter of the optical fiber from two different directions in a plane perpendicular to an advancing direction of the optical fiber.

6. A method for manufacturing an optical fiber according to claim 5, wherein the steps of generating twisting in the optical fiber is provided with a pair of pulleys, and the pulleys impact the twisting by moving the two pulleys forward and backward in opposing directions to each other along the center axial directions while sandwiching the optical fiber.

7. An apparatus for manfacturing an optical fiber, comprising: means for forming an optical fiber by drawing a preform; means for generating twisting in the optical fiber; and means for continuously measuring an outer meter of the optical fiber from two different directions in a plane perpendicular to an advancing direction of the optical fiber.

8. An apparatus for manufacturing an optical fiber according to claim 7, wherein the two different directions in a plane perpendicular to the longitudinal direction of the optical fiber form an angle θ corresponding to an odgin which is a core of the optical fiber, and the angle θ is set in the range of 0°<θ<90° or 90°<θ<180°.

9. An apparatus for manufacturing an optical fiber according to claim 7, wherein the angle θ is set in the range of 25°<θ<65° or 115°<θ<155°.

10. An apparatus for manufacturing an optical fiber according to claim 7, wherein means for generating twisting in the optical fiber is provided with a pair of pulleys which impact the twisting by moving the two pulleys forward and backward in opposing directions to each other along the center axial directions while sandwiching the optical fiber.

* * * * *